US008576860B2

(12) United States Patent
Hassan et al.

(10) Patent No.: US 8,576,860 B2
(45) **Date of Patent: *Nov. 5, 2013**

(54) WIRELESS/LAN ROUTER QUEUING METHOD AND SYSTEM

(75) Inventors: Ahmed E. Hassan, Waterloo (CA); John Ferguson Wilson, Waterloo (CA); Vi Thuan Banh, Mississauga (CA)

(73) Assignee: BlackBerry Limited, Waterloo, Ontario (CA)

( * ) Notice: Subject to any disclaimer, the term of this patent is extended or adjusted under 35 U.S.C. 154(b) by 194 days.

This patent is subject to a terminal disclaimer.

(21) Appl. No.: 12/947,907

(22) Filed: Nov. 17, 2010

(65) Prior Publication Data

US 2011/0064064 A1 Mar. 17, 2011

Related U.S. Application Data

(63) Continuation of application No. 11/868,116, filed on Oct. 5, 2007, now Pat. No. 7,852,862, which is a continuation of application No. 10/324,481, filed on Dec. 19, 2002, now Pat. No. 7,296,067.

(51) Int. Cl.
*H04L 12/28* (2006.01)

(52) U.S. Cl.
USPC .......................................... 370/401; 370/412

(58) Field of Classification Search
USPC ................. 370/338, 395.4, 395.71, 401, 412
See application file for complete search history.

(56) References Cited

U.S. PATENT DOCUMENTS 4,510,599 A * 4/1985 Ulug ............................ 370/463
4,870,639 A 9/1989 Hayashi et al.
5,159,592 A 10/1992 Perkins
5,175,732 A * 12/1992 Hendel et al. ................ 370/463
5,327,426 A 7/1994 Dolin, Jr. et al.

(Continued)

FOREIGN PATENT DOCUMENTS

CA 2510498 7/2004
EP 0483547 5/1992

(Continued)

OTHER PUBLICATIONS

Douglas E. Corner, "Internetworking with TCP/IP", 1991, pp. 44-49, 365-385, second edition, vol. 1.

(Continued)

*Primary Examiner* — Yemane Mesfin
*Assistant Examiner* — Wanda Z Russell
(74) *Attorney, Agent, or Firm* — Bereskin & Parr LLP/S.E.N.C.R.L., s.r.l.

(57) ABSTRACT

A queuing method and system for wireless/LAN routers processes and routes an incoming data packet from a wireless mobile network to a destination server. The system uses a wireless transport module to initiate storage of the data packet in a permanent storage device while simultaneously forwarding the data packet to the destination server. A database thread is used to manage the operations being performed on the data packet and for initiating the storage of the data packet in a permanent storage device based on a permanent storage queue. A main thread is used to simultaneously forward the data packet to the destination server. The wireless transport module is adapted to determine whether the data packet has been acknowledged by the destination server and aborting the storage of the data packet in the permanent storage device once acknowledgment from by destination server has been received.

31 Claims, 5 Drawing Sheets

(56) References Cited

U.S. PATENT DOCUMENTS

| | | | | |
|---|---|---|---|---|
| 5,355,365 | A | 10/1994 | Bhat et al. | |
| 5,982,813 | A * | 11/1999 | Dutta et al. | 375/219 |
| 6,044,146 | A | 3/2000 | Gisby et al. | |
| 6,134,432 | A | 10/2000 | Holmes et al. | |
| 7,181,507 | B1 * | 2/2007 | Lavelle et al. | 709/220 |
| 7,296,067 | B2 | 11/2007 | Hassan et al. | |
| 7,852,862 | B2 | 12/2010 | Hassan et al. | |
| 2002/0146016 | A1 | 10/2002 | Liu et al. | |
| 2003/0110435 | A1 | 6/2003 | Wu et al. | |
| 2003/0134621 | A1 * | 7/2003 | Yabe et al. | 455/413 |
| 2003/0161280 | A1 | 8/2003 | Gruhn et al. | |
| 2005/0102422 | A1 * | 5/2005 | Yamamote et al. | 709/238 |
| 2005/0169204 | A1 | 8/2005 | Haumont et al. | |
| 2006/0002301 | A1 | 1/2006 | Liu et al. | |
| 2006/0268349 | A1 * | 11/2006 | Tamura | 358/400 |
| 2008/0025244 | A1 | 1/2008 | Hassan et al. | |

FOREIGN PATENT DOCUMENTS

| | | |
|---|---|---|
| EP | 1573968 | 8/2006 |
| WO | 9315572 | 8/1993 |
| WO | 2004057799 A1 | 7/2004 |

OTHER PUBLICATIONS

Sun Microsystems, User manual for Unix OS, Mar. 2, 1987, Section: Screen Command, pp. 1-12.

Fifth Nordic Seminar on Digital Mobile Radio Communications, Dec. 1992, Helsinki, Finland, pp. 389-395, XP458679, Chakraborty "Data Interworking with GSM".

Canadian Office Action dated Apr. 24, 2008, Canadian Patent Application No. 2,510,498.

Chinese Office Action (English Translation) dated Dec. 1, 2006, Chinese Patent Application No. 03826005.0.

Chinese Office Action dated Feb. 1, 2008, Chinese Patent Application No. 03826005.0.

Chinese Office Action dated Jun. 20, 2008, Chinese Patent Application No. 03826005.0.

International Preliminary Examination Report dated May 19, 2004, International Patent Application No. PCT/CA03/00194.

European Examination Report dated Aug. 31, 2005, European Patent Application No. 03701407.3.

Response. European Patent Application No. 03701407.3. Dated: Oct. 26, 2005.

Communication under Rule 51(4) EPC. European Patent Application No. 03701407.3. Dated: Dec. 5, 2005.

Decision to grant a European patent pursuant to article 97(2) EPC. European Patent Application No. 03701407.3. Dated: Jul. 6, 2006.

Canadian Notice of Allowance. Canadian Patent Application No. 2,510,498. Dated: Mar. 6, 2009.

Notification of Completion of Formalities and Grant. Chinese Patent Application No. 03826005.0 Dated: Dec. 26, 2008.

Notification of Grant. Singapore Patent Application No. 200503843-5. Dated: Jun. 29, 2007.

Certificate of Grant of Patent. Singapore Patent Application No. 200503843-5. Dated: Jun. 29, 2007.

Patent Certificate. Indian Patent Application No. 2811/DELNP/2005. Dated: Jun. 30, 2010.

Prosecution Documents for U.S. Appl. No. 10/324,481, issued to Patent No. 7,296,067 on Nov. 13, 2007.

Prosecution Documents for U.S. Appl. No. 11/868,116, issued to Patent No. 7,852,862 on Dec. 14, 2010.

* cited by examiner

WIRELESS/LAN ROUTER QUEUING METHOD AND SYSTEM

CROSS-REFERENCE TO RELATED APPLICATIONS

This application is a continuation of U.S. patent application Ser. No. 11/868,116, filed Oct. 5, 2007 now U.S. Pat. No. 7,852,862, which is a continuation of U.S. patent application Ser. No. 10/324,481, filed on Dec. 19, 2002. U.S. patent application Ser. No. 11/868,116 issued to patent as U.S. Pat. No. 7,852,862, and U.S. patent application Ser. No. 10/324,481 issued to patent as U.S. Pat. No. 7,296,067. The entire contents of application Ser. No. 11/868,116, and application Ser. No. 10/324,481, are hereby incorporated by reference.

TECHNICAL FIELD

This invention relates to wireless networks and more particularly to a queuing method and system for wireless/LAN routers.

BACKGROUND

The delivery of text-based messages (i.e. data packets) from a sending device to one or more receiving devices over a wireless LAN, presents special challenges. Typically, the message is routed through a wireless gateway where it is stored until it has been transmitted to, and stored within, an electronic mail server of the data network. Receiving devices are then able to retrieve stored messages from the electronic mail server at their convenience. The speed at which electronic messages are transmitted from a sending to a receiving device depends in part on how efficiently data packets are transported from a sending mobile device to an electronic mail server through wireless communication networks.

When a wireless gateway receives a data packet from a mobile device over a wireless network, the received data packet is sent to a destination electronic mail server. However, to ensure that the data packet is successfully transmitted to the destination electronic mail server and not lost in the meantime, the wireless gateway generally stores the data packet in an internal permanent storage device (e.g. a database server or a file system) before transmitting the data packet. Typically, the wireless gateway waits until the permanent storage device confirms storage of the data packet before proceeding with processing the data packet or even with sending acknowledgement of the receipt of the data packet back to the mobile device. This kind of storage procedure appreciably slows down the processing of data packets within the router.

SUMMARY

The invention provides in one aspect, a method of processing and routing a data packet from a wireless mobile network to a destination server, said method comprising the steps:

receiving the incoming data packet from the wireless mobile network;

initiating the storage of the data packet in a permanent storage device based on a permanent storage queue;

simultaneously delivering the data packet to the destination server based on a main queue;

determining whether the data packet has been acknowledged by the destination server; and aborting the storage of the data packet in the permanent storage device if the data packet has been acknowledged by the destination server and if the storage of the data packet has not been completed.

In another aspect, the present invention provides a system for processing and routing an incoming data packet from a wireless mobile network to a destination server, the system comprising:

a wireless transport module for receiving the incoming data packet from the wireless mobile network;

a permanent storage device associated with the wireless transport module for storing the data packet until acknowledgement of the data packet from the destination server;

a database thread associated with the wireless transport module adapted to manage the operations being performed on the data packet and for initiating the storage of the data packet in a permanent storage device based on a permanent storage queue;

a main thread associated with the wireless transport module for simultaneously delivering the data packet to the destination server based on a main queue;

said wireless transport module being adapted to determine whether the data packet has been acknowledged by the destination server and aborting the storage of the data packet in the permanent storage device if the data packet has been acknowledged by the destination server and if the storage of the data packet has not been completed.

In another aspect, the present invention provides a computer-readable medium having stored thereon a set of instructions, said set of instructions, which when executed, perform the steps comprising:

receiving an incoming data packet from a wireless mobile network;

initiating the storage of the data packet in a permanent storage device based on a permanent storage queue;

simultaneously delivering the data packet to the destination server based on a main queue;

determining whether the data packet has been acknowledged by the destination server; and aborting the storage of the data packet in the permanent storage device if the data packet has been acknowledged by the destination server and if the storage of the data packet has not been completed.

Further aspects and advantages of the invention will appear from the following description taken together with the accompanying drawings.

DETAILED DESCRIPTION

Figure 1:
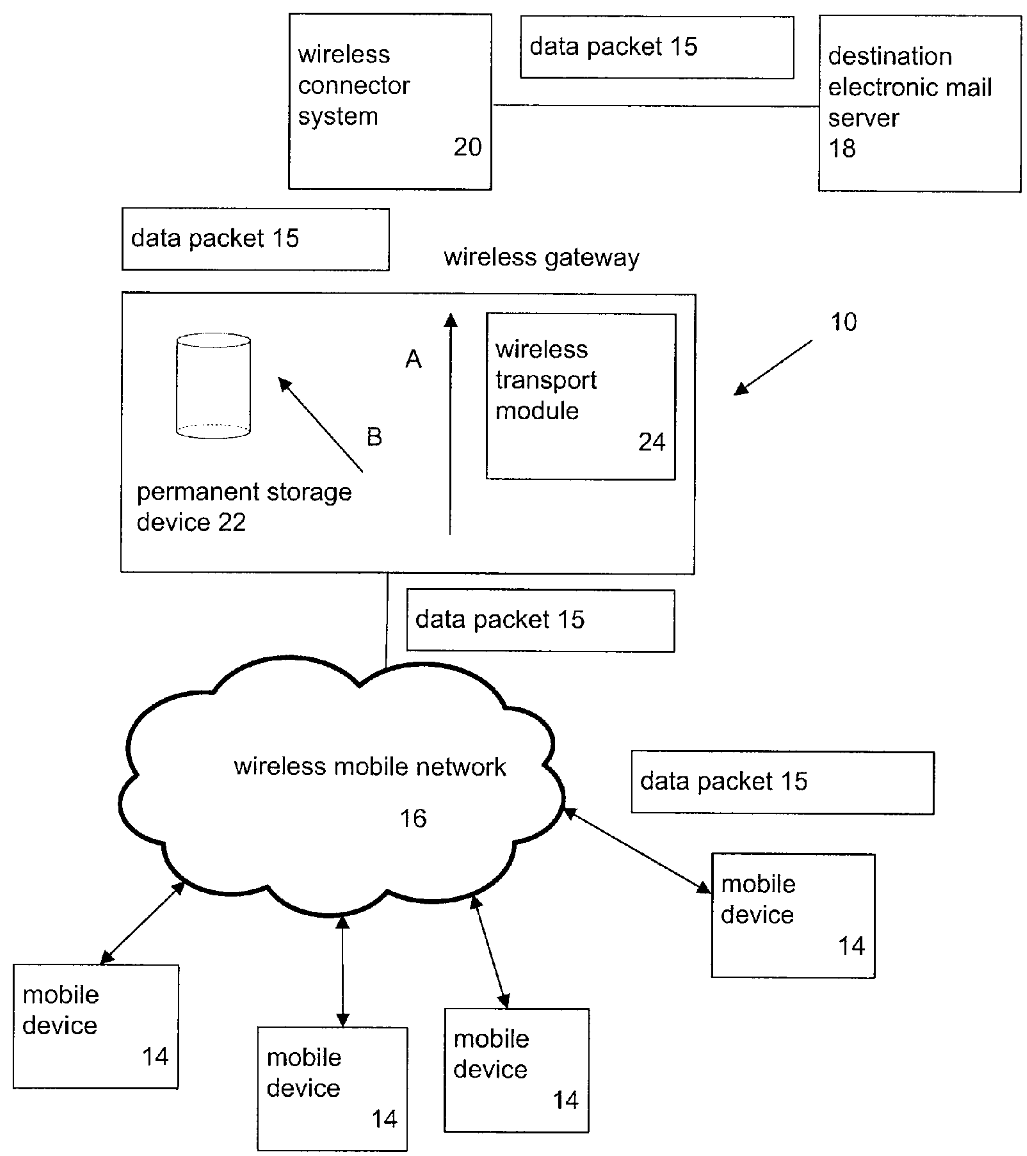
FIG. 1 is a schematic diagram of one embodiment of the wireless gateway of the present invention and the surrounding network environment.

FIG. 1 illustrates the main elements of a wireless gateway 10 built in accordance with a preferred embodiment of the invention. Specifically, wireless gateway 10 is adapted to route data packets 15 received from a mobile data communication device 14 over wireless mobile network 16 to a destination electronic mail server 18 through a wireless connector system 20. Specifically, wireless communication network 10 allows for a more efficient routing of data packets 15 (i.e. messages) from mobile device 14 to destination electronic mail server 18 through wireless gateway 10 while still providing a high degree of data packet safety.

Mobile device 14 is any commercially available mobile data communication device adapted to transmit data packets 15 to wireless mobile network 16 (e.g. IEEE 802.11 standard) or any other wireless protocol for wireless communication. In a preferred embodiment mobile device 14 is a hand-held two-way wireless paging device, however, mobile device 14 could, alternatively be any other type of mobile communication device capable of sending and receiving messages via wireless mobile network 16, such as two-way paging computers, personal digital assistants (PDAs), portable electronic messaging devices, cellular phones, or handheld e-mail clients.

Wireless mobile network 16 is preferably a wireless packet data network, (e.g. Mobitex™ or DataTAC™), which provides radio coverage to mobile devices 14 and has limited bandwidth capabilities, although it could be any other types of commercially available wireless networks. Depending on the type of wireless mobile network 16 utilized, it may be necessary to route data packets 15 between a TCP wireless gateway 10 connection and an X.25 or IP address mobile network connection and vice versa using an intermediary routing mechanism that provides TCP clients access to an X.25 connection. As is conventionally, known such a wireless mechanism could use NET ID (DataTAC) or FST MAN (Mobitex) to connect to wireless mobile network 16.

Wireless gateway 10 forms a connection or bridge between the servers and wireless networks associated with wireless e-mail communication. Specifically, wireless gateway 10 is coupled between wireless LAN 16 and the hardwired data network that includes wireless connector system 20 and destination electronic mail server 18. Wireless gateway 10 includes a permanent storage device 22 and a wireless transport module 24.

Permanent storage device 22 can be implemented by any commercially available database server with the appropriate speed and storage capacity. Permanent storage device 22 contains system configuration information, system state data, and tables that store mobile device 14 information.

Wireless transport module 24 is the interface between mobile device 14 and wireless gateway 10. Specifically, wireless transport module 24 communicates with wireless mobile network 16 using the intermediary routing mechanism discussed above (provides TCP clients access to an X.25 or UDP connection) and assembles data packets 15 being received from mobile device 14 over wireless mobile network 16. Once data packets 15 are assembled, they are sent to the upper layer of the wireless transport module 24 for simultaneous storage in permanent storage device 22 and processing through wireless gateway 10 to wireless connection system 20 and eventually to destination electronic mail gateway 18.

Wireless connector system 20 is part of the wired, backbone network and is coupled to wireless gateway 10. Wireless connector system 20 communicates with wireless gateway 10 and each electronic message server that connects to wireless gateway as a unique address called a UID or an SRP ID.

Destination electronic mail server 18 is coupled to wireless connector system 20 and is a conventional electronic mail server (e.g. Exchange Server manufactured by Microsoft of Seattle, Wash.). It should be understood that any other commercially available electronic mail server could be utilized within wireless gateway 10. For purposes of illustration, only destination electronic mail server 18 has been discussed as a possible destination, although it should be understood that the inventive method of wireless gateway 10 is applicable to various types of destination devices and communication service (e.g. weather service, news service, stock quote service, etc.)

Figure 2:
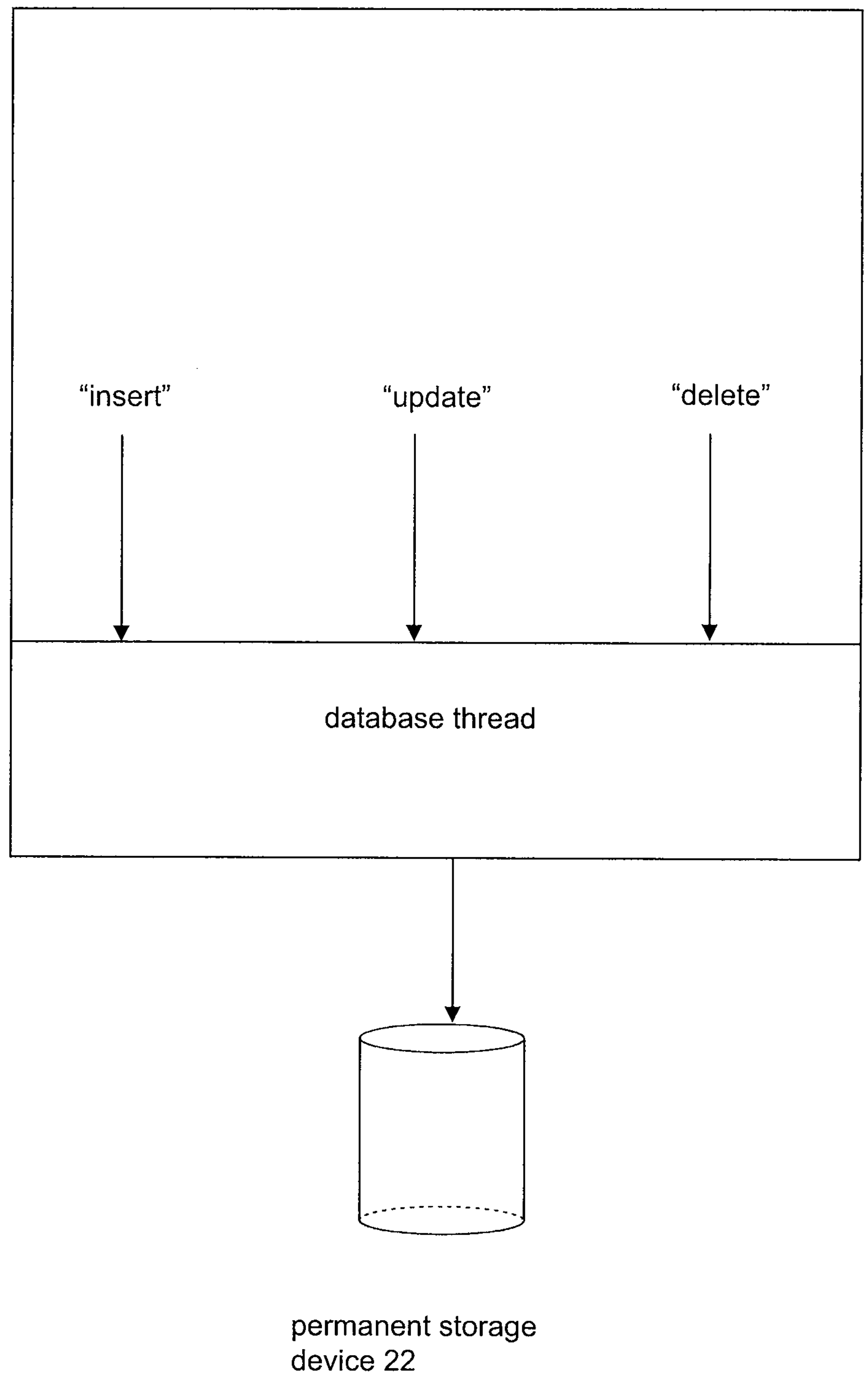
FIG. 2 is a schematic diagram of the database thread that manages the permanent storage queue implemented in the wireless transport module and utilized to store data packets within the permanent storage device of FIG. 1.

Now referring to FIGS. 1 and 2, according to the queuing method of the present invention, when wireless gateway 10 receives a data packet 15 from wireless mobile network 16, wireless transport module 24 routes the data packet to the electronic mail server 18 (path A on FIG. 1) while simultaneously to write data packet 15 into permanent storage device 22 (path B on FIG. 1). These two actions are conducted in parallel using separate but concurrently running computational threads. Specifically, a database thread is used to write data packet 15 into the permanent storage device 22 and a main thread is used to forward data packet 15 to the destination server 18.

The main thread is used to forward data packet 15 to destination electronic mail server 18 through wireless connector system 20. The main thread manages the transport of data packets 15 to destination electronic mail server 18 using a main queue. In many cases wireless gateway 10 can deliver a data packet to a destination address (e.g. destination electronic mail server 18) using main thread, faster than it can write the data packet to permanent storage device 22. In such cases, the method of the present invention achieves a more efficient throughput of data packet 15 through wireless gateway 10 since it is not necessary to devote processing time to the storage of data packet 15 in permanent storage device 22.

The database thread shown in FIG. 2 is used to manage and coordinate the storage of data packets 15 in permanent storage device 22. The database thread manages the storage of data packets 15 within permanent storage device 22 using a permanent storage queue. Individual worker threads (not shown) are associated with the three basic operations that are carried out on data packets 15, namely "insert", "update" and "delete". When wireless gateway 10 receives a message from mobile device 14, an "insert" operation is posted. When the routing endpoint (i.e. the connection point) within the wireless gateway 10 has been located, then the message is updated in the permanent storage device 22 using the "update" operation to reflect the routing information within wireless gateway 10. The wireless gateway 10 routing data is saved in the event of a component failure or work re-distribution. When an "acknowledgement" message is received from wireless connector system 20, then a "delete" operation is posted.

Database thread keeps track (and updates it as necessary) of the operation that is being performed on the data packet and acts as an intelligent buffer between wireless transport module 24 and the permanent storage device 22. At any one time, there is at most one pending operation. It should be noted that when an "update" operation is received following the initial "insert" operation, data packet 15 is operated on in place (i.e. within wireless gateway 24) along with the associated queue entry within database thread to reduce memory and CPU overhead. Also, if an "update" operation is posted before the "insert" operation can occur, then the data packet 15 to be inserted is changed to reflect the update in place. The "insert" operation will then continue as normal. If an "update" operation is posted after the "insert" operation has been completed, then the "update" operation is submitted to the permanent storage queue. If the "delete" operation is posted before an "update" operation can occur, then the "update" operation is removed from the permanent storage queue and replaced with the "delete" operation. Accordingly, the work in the queue reflects the current state/operation of the message. This allows wireless gateway 10 to more efficiently process data messages since there is no storage of additional operations as is normally the case.

Figure 3:
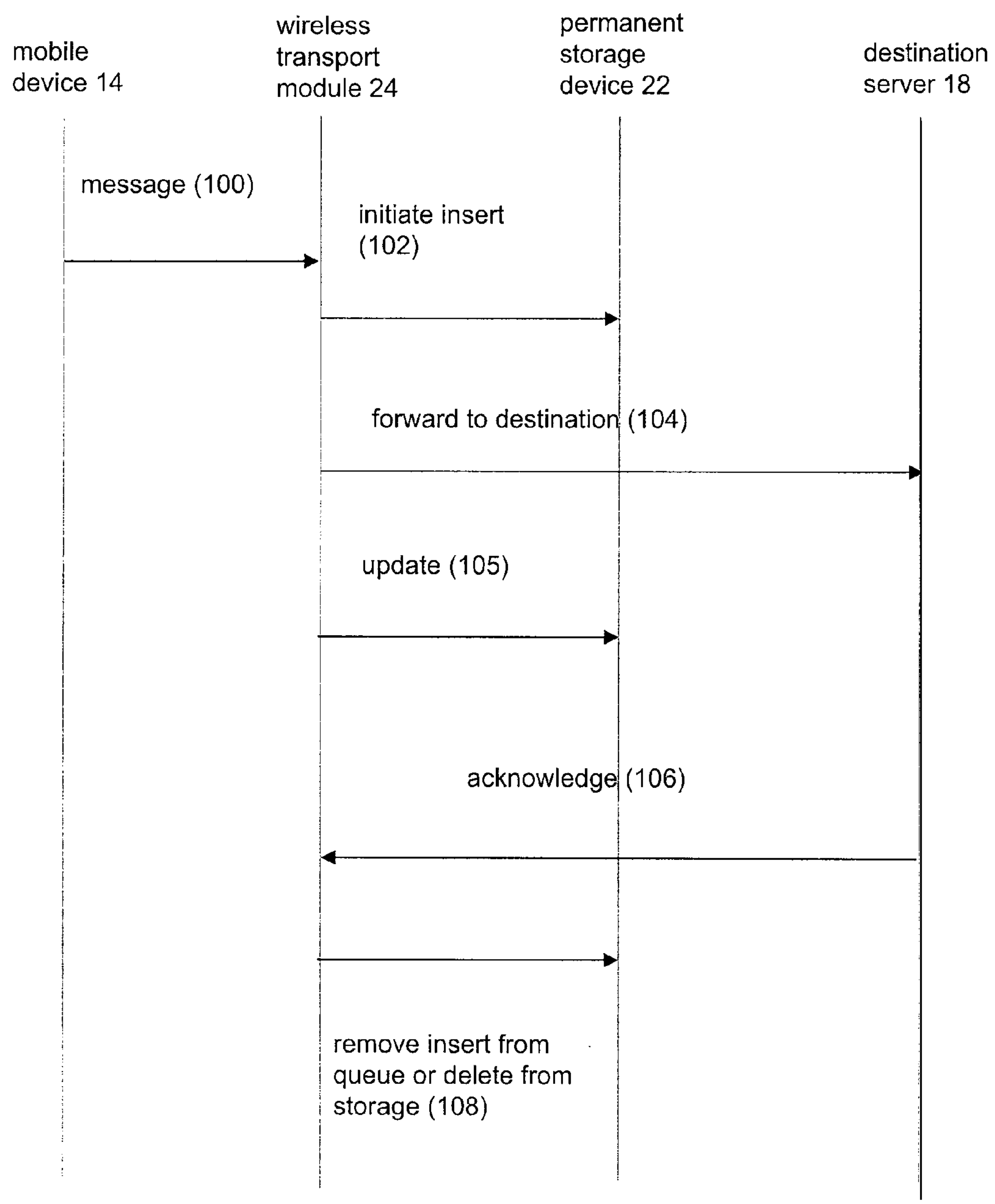
FIG. 3 is an event sequence diagram that illustrates the typical data flow of a data packet sent from mobile device to destination electronic mail server through wireless connector system of FIG. 1.

FIG. 3 is an event sequence diagram that illustrates an example data flow of data packet 15 sent by mobile device 14 to destination electronic mail server 18.

Specifically, data packet 15 is sent from mobile device 14 to wireless transport module 22 at (100). At (102), wireless transport module 24 initiates the storage of data packet 15 into a table within permanent storage device 22 by the associated "insert" operation within the permanent storage queue. The specific operation of permanent storage queue is detailed in detail below in association with FIG. 4. Data packet 15 is then simultaneously forwarded to destination electronic mail server 18 at (104). Specifically, wireless transport module 24 determines the type of destination device to which data packet 15 is being sent to and implements appropriate data packet handling steps depending on the destination device type.

At (105), when the location of the routing endpoint within wireless gateway 10 is located, wireless transport module 24 posts an "update" operation from mobile device 14. That is, the message is to be updated in permanent storage device 22 to reflect this discovered routing information. At (106), destination mail server 18 sends an acknowledgement (or refusal) to wireless transport module 24. In response, at (108) wireless transport module 24 carries out the "delete" operation. Specifically, in the case where data packet 15 has already been inserted into permanent storage device 22, wireless transport module 24 deletes data packet 15 from permanent storage device 22. Alternatively, in the case where the "insert" operation associated with data packet 15 is still in the permanent storage queue, wireless transport module 24 removes this "insert" operation from the permanent storage queue so that data packet 15 is not written to permanent storage device 22. It should be understood that these actions would also be performed by wireless transport module 24 in the case where data packet 15 has "expired", that it is not possible to reach the intended destination within a configurable period of time. Wireless transport module 24 sends an internal status acknowledgement confirming that message delivery is complete once data packet 15 is inserted into permanent storage device 22 or if data packet 15 is delivered to destination server 18. This step can also involve deletion of data packet 15 from various other local memories within wireless gateway 10.

Figure 4:
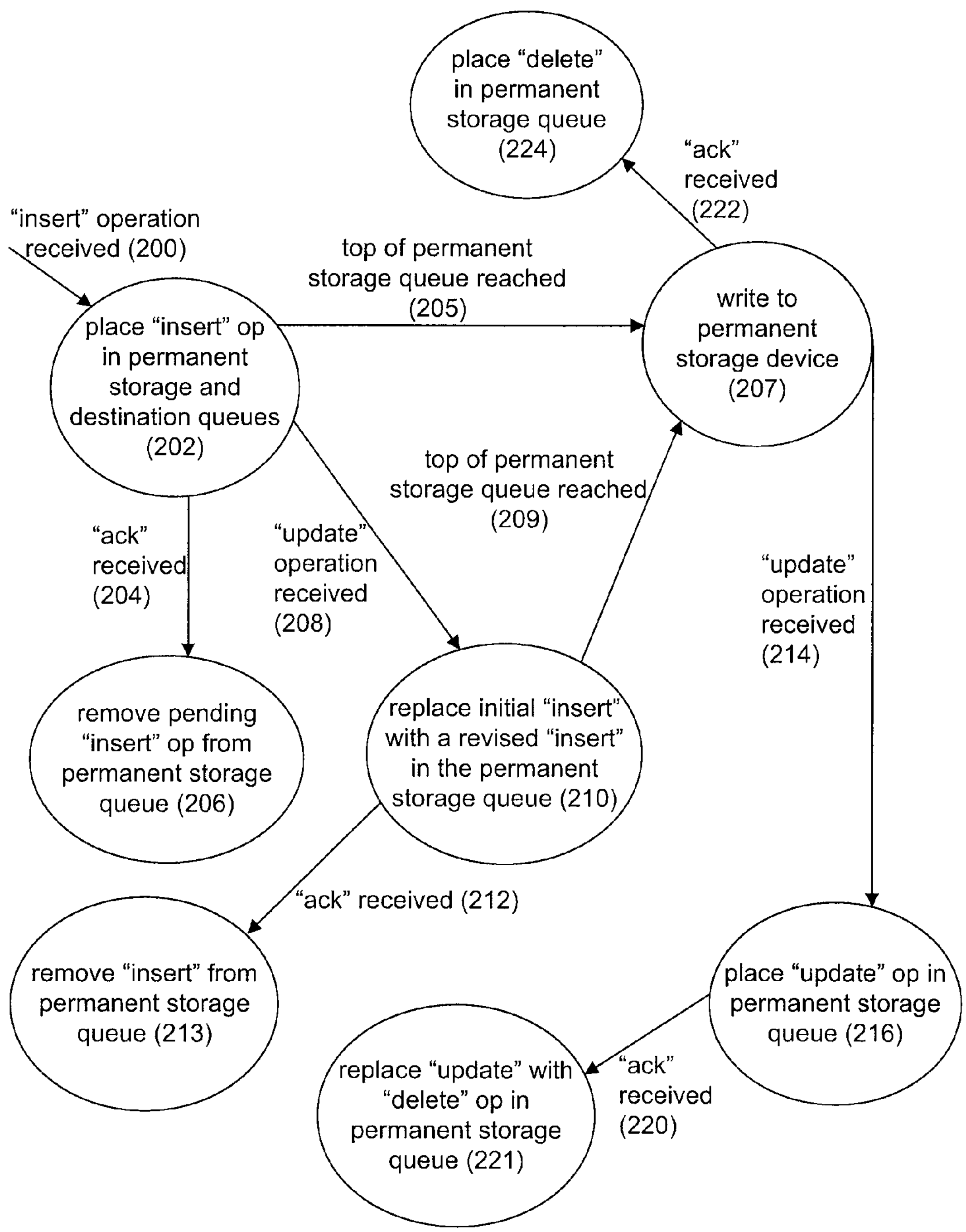
FIG. 4 is a finite state machine representation of the functionality of the database thread of FIG. 2.

FIG. 4 is a finite state machine illustrating how the database thread manages the "insert", "update" and "delete" operations that are applied to a data packet 15 within the permanent storage queue. As discussed above, database thread manages the position and content of the various operations within permanent storage queue to provide an efficient utilization of permanent storage device 22. Specifically, the database thread combines data packet 15 operations in order to minimize the number of storage operations. That is, there is at most one operation for any data packet 15 within the permanent storage queue. The database thread also prioritizes data packet 15 operations within permanent storage queue to minimize the number of storage operations as will be discussed in respect of FIG. 5.

As shown, an "insert" data packet 15 operation is first received by wireless transport module 22 at (200). Then at (202), the database thread places the "insert" operation within the permanent storage queue and the main queue simultaneously.

At (202), if destination electronic mail server 18 sends an "acknowledgement" at (204) then at (206), the pending "insert" operation for that data packet 15 in the permanent storage queue is removed. That is, in the case where data packet 15 is delivered to destination server 18 faster than the database thread causes data packet 15 to be inserted into permanent storage device 22, it is possible to avoid having to access permanent storage device 22. Accordingly, it is possible, depending on the availability and response time of the destination devices at issue, to eliminate a substantial proportion of access to permanent storage device 22.

Alternatively, if at (202), if the "insert" operation reaches the top of the permanent storage queue at (205), then data packet 15 is written to permanent storage device 22 at (207). If destination electronic mail server 18 sends an "acknowledgement" at (222), then at (224), the "delete" operation is placed within permanent storage queue to effect the removable of data packet 15 from the appropriate storage table in permanent storage device 22. If an "update" operation is received at (214) prior to the "acknowledgement" from destination server 18 (222), then at (216), the "update" operation is placed in the permanent storage queue. Once the "acknowledgement" is received from destination server 18, the "update" operation is replaced with a "delete" operation in the permanent storage queue at (221).

Alternatively, at (202) if an "update" operation is posted by wireless gateway 10 (i.e. routing endpoint has been located) at (208), before data packet 15 reaches and is acknowledged by destination electronic mail server 18 and before the top of the permanent storage queue is reached, then the initial "insert" operation is replaced with a revised "insert" operation in the permanent storage queue at (210). This revised "insert" operation consists of an updated version of the original data packet 15 that was to be initially inserted. That is, if an insert operation has not yet been performed on permanent storage device 22 (i.e. the "insert" operation is still in the permanent storage queue), then the initial "update" operation and the later sent "insert" operation are combined into a new "insert" command. Accordingly, these two operations are consolidated into one for placement in the permanent storage queue reducing prospective storage operations.

At (210), if the "insert" operation reaches the top of the permanent storage queue at (209) then at (207), the data packet 15 is written to permanent storage device 22 according to the revised "insert" operation (which combined the original "insert" operation and the "update" operation). When an "acknowledgement" is received from destination e-mail server 18 at (222), the "delete" operation is placed in the permanent storage queue at (224) to effect removal of data packet 15 from the table in permanent storage device 22. Again, if an "update" operation is received at (214) prior to the "acknowledgement" from destination server 18, then at (216), the "update" operation is placed in the permanent storage queue. Once the "acknowledgement" is received from destination server 18, the "update" operation is replaced with a "delete" operation in the permanent storage queue at (221).

Alternatively, if at (210), electronic mail server 18 sends an "acknowledgement" at (212) then at (213) the pending "insert" operation is removed from the permanent storage queue. This is done, since data packet 15 has not been written to permanent storage device 22 and accordingly, there is no need to evoke the "delete" operation to remove it from storage.

Figure 5:
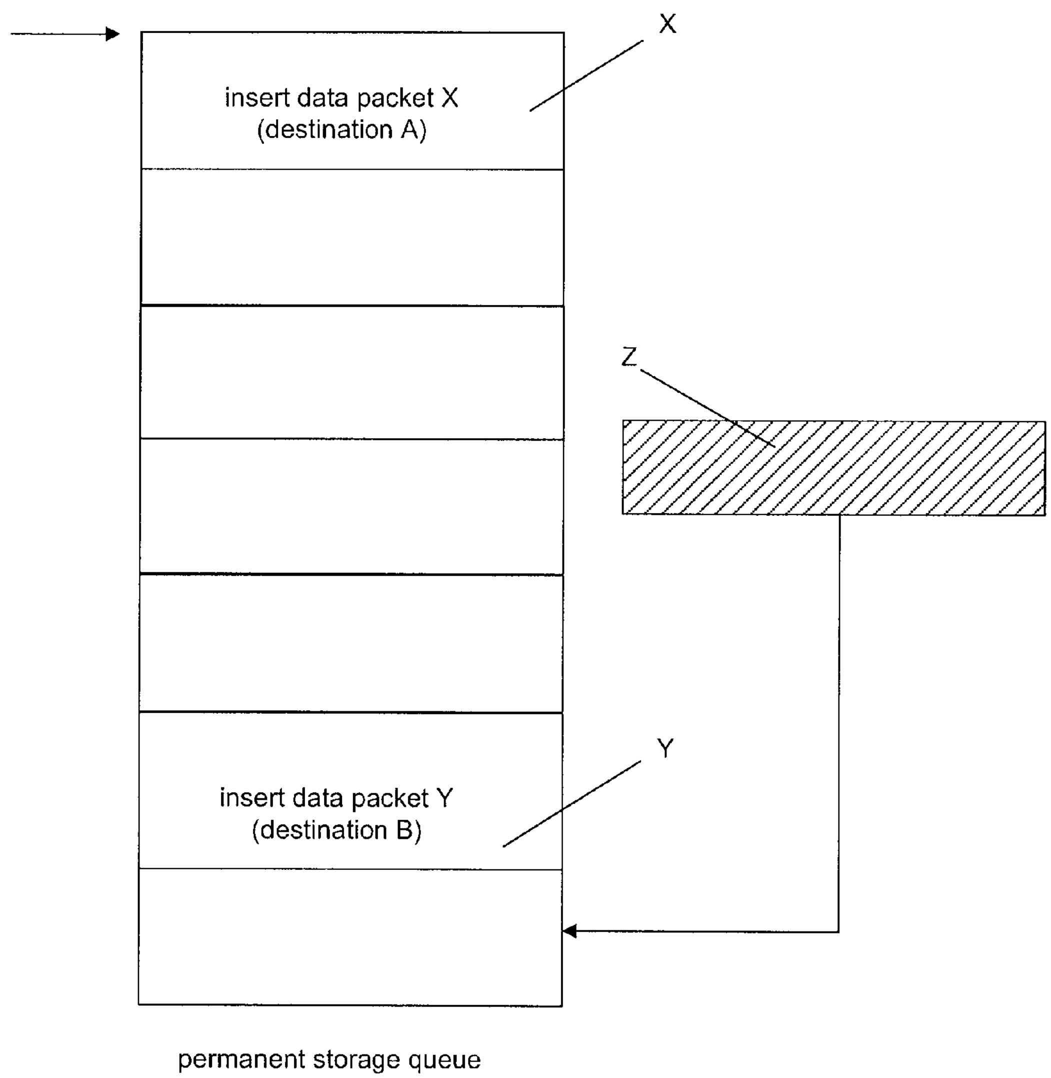
FIG. 5 is a schematic diagram illustrating an example of a permanent storage queue utilized to store data packet operations within the permanent storage device of FIG. 1.

FIG. 5 illustrates an example of a permanent storage queue for wireless transport module 24 of wireless gateway 10. Each data packet 15 in permanent storage queue is placed there to be forwarded to permanent storage device 22 for storage and each data packet operation is associated with a particular destination device. Again, while the destination device in the illustrative example of FIG. 1 is a destination electronic mail server 18, it should be understood that various types of destination devices could be accommodated.

The database thread of wireless transport module 22 optimizes the processing of data packets 15 through strategic placement of data packets 15 operations within the permanent storage queue. Normally, queue elements are ordered in the permanent storage queue based on the order of arrival of the message from mobile device 22. That is, the introduction of an "update" or "delete" operation will not change the order of the element in the queue. However, in wireless gateway 10, database thread prioritizes data packet 15 operations in the permanent storage queue according to the time is takes to send data packet 15 and to receive the acknowledgement of reception from a destination device for a particular destination device. Specifically, database thread keeps a running record log of the average length of time required on average for a data packet 15 to be sent to a particular destination device. The inverse of a measure of the average delivery time is then used to queue data packet 15 operations in the permanent storage queue. That is, if a destination device is known to reply quickly (i.e. has in the past replied quickly) to wireless gateway 10 then it is advantageous to position the associated data packet 15 operation near the bottom of the permanent storage queue to provide delay to avoid processing the associated data packet 15 operation (i.e. storing data packet or an update in permanent storage). In this way storage processing costs associated with storing data packet 15 in permanent storage device 22 can be reduced.

It is preferable to use the inverse of the moving average of the delivery time of data packet 15 to a destination device to determine the position of a data packet 15 operation within permanent storage device 22 instead of average delivery time. Specifically, it has been determined that it is desirable to keep track of delivery times for the past 10 messages. By using a moving average measure, wireless gateway 10 is able to react much faster to changes in the state of the destination device and the overall communication network. For example, when a destination device dies (i.e. becomes unreachable), the moving average will reflect the delay in packet delivery for that destination device much faster than an average count would. Another example, where the moving average approach is preferable is where the destination device is too overloaded with work (i.e. "too busy") to reply.

For example, as shown, data packet operation "X" is positioned at the top of the permanent storage queue and is associated with data packet X and destination device A. Data packet operation "Y" is positioned near the bottom of the permanent storage queue and is associated with data packet Y and destination device B. As shown, data packet operation "Z" is now being entered by database thread into permanent storage queue. If it is determined that the average of the delivery time (i.e. the time required to send and receive acknowledgement back from destination device) of data packet Z to destination device C is shorter than that associated with data packet operation "Y", then data packet operation "Z" will be placed below "Y" within the permanent storage queue as shown. Since data packet operation "Z" will be positioned below data packet operation "Y", it is increasingly possible that destination device C will acknowledge receipt of data packet Z before data packet operation "Z" reaches the top of the queue. In such a case, the processing time associated with storing data packet Z will be saved.

Further, other factors relating to the accessibility of the destination device at issue are taken into account when positioning a data packet 15 operation in the permanent storage queue. For example, in a case where there it is determined that a destination device in not connected within the network 10, the database thread automatically puts the associated data packet 15 operation at the top of the permanent storage queue. Similarly, where the destination device specified with the data packet 15 is "invalid" then main thread causes wireless transport module 24 to provide an emergency message back to mobile device 14.

Finally, it is preferred that the main thread places data packet 15 operations within main queue based on the moving average delivery time for previous data sent to the destination device. However, it is also possible for main thread to arrange data packet 15 operations according to the First In First Out (FIFO) standard. That is, queue elements are ordered in the main queue based on the arrival of the message from mobile device 14.

It has been determined by the inventors that by constructing permanent storage queue such that memory storage operations are first attempted in cases where data packet 15 is unlikely to be received and acknowledged by destination electronic mail server 18 before it can be stored within permanent storage device 22 (i.e. in the case of slow or off-line destination devices), the efficiency of storage operations can be substantially improved. Also, increased throughputs of data packets 15 have been observed, namely, an increase in message processing from approximately 12 messages per second to approximately 200 messages per second under spike load and approximately 150 messages per second for a sustained load.

It should be understood that while the specific communication equipment has been chosen and discussed for illustrative purposes, the present invention is applicable to any type of network routing system, including wireless LAN routes, LAN to LAN routers, router-based communication networks having dial-up users, and other general router-based communication networks.

Accordingly, wireless gateway 10 allows for improved routing of data packets to a destination server 18 while still guaranteeing a high degree of data safety. Specifically, by simultaneous forwarding of data packets 15 to permanent storage device 22 and destination electronic mail server 18, since for the cases where data packets 15 are received by a destination device and removed from the permanent storage queue, there is no requirement to perform costly permanent storage operations. By reducing the number of permanent storage device writing operations, wireless gateway 10 is able to handle a substantially higher volume of messages then would otherwise be the case where data packets 15 are first stored within a wireless gateway before being forwarded to a destination device. Further, this approach reduces the network traffic between wireless transport module 24 and permanent storage device 22 and the associated CPU usage for both wireless transport module 24 and permanent storage device 22. Finally, this approach reduces the effective cost of hardware since it is possible to achieve a higher volume of processing using the same hardware.

As will be apparent to those skilled in the art, various modifications and adaptations of the structure described above are possible without departing from the present invention, the scope of which is defined in the appended claims.

The invention claimed is:

1. A method of storing a data packet in a storage device, the method comprising:

receiving an insert data packet operation element by a wireless transport module, wherein the data packet has been transmitted to a destination device, the insert data packet operation element being an instruction to write the data packet to the storage device;

placing the insert data packet operation element into a storage queue; and removing the insert data packet operation element from the storage queue if an acknowledgement of the data packet is received from the destination device and if the data packet has not been written to the storage device.

2. The method of claim 1, further comprising writing the data packet to the storage device if the acknowledgement of the data packet has not yet been received from the destination device and if the insert data packet operation element is at the top of the storage queue.

3. The method of claim 2, further comprising placing a delete data packet operation element in the storage queue to effect removal of the data packet from the storage device if the acknowledgement of the data packet is received from the destination device after the data packet is written to the storage device.

4. The method of claim 2, further comprising placing an update data packet operation element in the storage queue if the update data packet operation element is received by the wireless transport module and if the acknowledgement of the data packet has not yet been received from the destination device.

5. The method of claim 4, further comprising replacing the update data packet operation element with a delete data packet operation element in the storage queue to effect removal of the data packet from the storage device if the acknowledgement of the data packet is received from the destination device after the update data packet operation element is placed in the storage queue.

6. The method of claim 1, further comprising replacing the insert data packet operation element in the storage queue with a revised insert data packet operation element if an update data packet operation element is received by the wireless transport module, if the acknowledgement of the data packet has not yet been received from the destination device, and if the insert data packet operation element is not at the top of the storage queue.

7. The method of claim 6, wherein the revised insert data packet operation element comprises an updated version of the data packet.

8. The method of claim 7, further comprising writing the updated version of the data packet to the storage device if the acknowledgement of the data packet has not yet been received from the destination device and if the revised insert data packet operation element is at the top of the storage queue.

9. The method of claim 8, further comprising placing a delete data packet operation element in the storage queue to effect removal of the updated version of the data packet from the storage device if the acknowledgement of the data packet is received from the destination device after the updated version of the data packet is written to the storage device.

10. The method of claim 8, further comprising placing a second update data packet operation element in the storage queue if the second update data packet operation element is received by the wireless transport module and if the acknowledgement of the data packet has not yet been received from the destination device.

11. The method of claim 10, further comprising replacing the second update data packet operation element with a delete data packet operation element in the storage queue to effect removal of the updated version of the data packet from the storage device if the acknowledgement of the data packet is received from the destination device after the second update data packet operation element is placed in the storage queue.

12. The method of claim 7, further comprising removing the revised insert data packet operation element from the storage queue if an acknowledgement of the data packet is received from the destination device and if the updated version of the data packet has not been written to the storage device.

13. The method of claim 1, wherein the method is implemented using at least one database thread.

14. A device comprising a wireless transport module, wherein the device is configured to:

receive an insert data packet operation element, wherein the data packet has been transmitted to a destination device, the insert data packet operation element being an instruction to write the data packet to a storage device;

place the insert data packet operation element into a storage queue; and remove the insert data packet operation element from the storage queue if an acknowledgement of the data packet is received from the destination device and if the data packet has not been written to the storage device.

15. The device of claim 14, wherein the device is further configured to write the data packet to the storage device if the acknowledgement of the data packet has not yet been received from the destination device and if the insert data packet operation element is at the top of the storage queue.

16. The device of claim 15, wherein the device is further configured to place a delete data packet operation element in the storage queue to effect removal of the data packet from the storage device if the acknowledgement of the data packet is received from the destination device after the data packet is written to the storage device.

17. The device of claim 15, wherein the device is further configured to place an update data packet operation element in the storage queue if the update data packet operation element is received by the wireless transport module and if the acknowledgement of the data packet has not yet been received from the destination device.

18. The device of claim 17, wherein the device is further configured to replace the update data packet operation element with a delete data packet operation element in the storage queue to effect removal of the data packet from the storage device if the acknowledgement of the data packet is received from the destination device after the update data packet operation element is placed in the storage queue.

19. The device of claim 14, wherein the device is further configured to replace the insert data packet operation element in the storage queue with a revised insert data packet operation element if an update data packet operation element is received by the wireless transport module, if the acknowledgement of the data packet has not yet been received from the destination device, and if the insert data packet operation element is not at the top of the storage queue.

20. The device of claim 19, wherein the revised insert data packet operation element comprises an updated version of the data packet.

21. The device of claim 20, wherein the device is further configured to write the updated version of the data packet to the storage device if the acknowledgement of the data packet has not yet been received from the destination device and if the revised insert data packet operation element is at the top of the storage queue.

22. The device of claim 21, wherein the device is further configured to place a delete data packet operation element in the storage queue to effect removal of the updated version of the data packet from the storage device if the acknowledgement of the data packet is received from the destination device after the updated version of the data packet is written to the storage device.

23. The device of claim 21, wherein the device is further configured to place a second update data packet operation element in the storage queue if the second update data packet operation element is received by the wireless transport module and if the acknowledgement of the data packet has not yet been received from the destination device.

24. The device of claim 23, wherein the device is further configured to replace the second update data packet operation element with a delete data packet operation element in the storage queue to effect removal of the updated version of the data packet from the storage device if the acknowledgement of the data packet is received from the destination device after the second update data packet operation element is placed in the storage queue.

25. The device of claim 20, wherein the device is further configured to remove the revised insert data packet operation element from the storage queue if an acknowledgement of the data packet is received from the destination device and if the updated version of the data packet has not been written to the storage device.

26. A method of storing data to a storage device, the method comprising:

transmitting a data packet to a destination device;

placing the data packet into a storage queue of data to be stored in the storage device; and removing the data packet from the storage queue if an acknowledgement of the data packet is received from the destination device and if the data packet has not been written to the storage device.

27. The method of claim 26, wherein the data packet is placed in the storage queue for a time not less than a pre-determined time prior to writing the data packet to the storage device.

28. The method of claim 26, further comprising writing the data packet to the storage device if the acknowledgement of the data packet has not yet been received from the destination device and if the data packet is at the top of the storage queue.

29. The method of claim 28, further comprising placing a delete data packet operation in the storage queue to effect removal of the data packet from the storage device if the acknowledgement of the data packet is received from the destination device after the data packet is written to the storage device.

30. The method of claim 27, further comprising writing the data packet to the storage device if the acknowledgement of the data packet has not yet been received from the destination device upon expiration of the pre-determined time.

31. The method of claim 26, wherein the method is implemented using at least one database thread.

* * * * *